United States Patent [19]

Scott et al.

[11] 4,138,379

[45] Feb. 6, 1979

[54] ORGANIC SILANE STABILIZED AND PLASTICIZED POLYCARBONATE COMPOSITION

[75] Inventors: Steven W. Scott, Mount Pleasant, S.C.; Howard A. Vaughn, Jr., Schenectady, N.Y.

[73] Assignee: General Electric Company, Pittsfield, Mass.

[21] Appl. No.: 865,291

[22] Filed: Dec. 28, 1977

[51] Int. Cl.$^2$ ................................................ C08J 3/18
[52] U.S. Cl. ........................ 260/29.1 R; 260/29.1 SB
[58] Field of Search .................................... 260/29.1 R

[56] References Cited

U.S. PATENT DOCUMENTS

| | | | |
|---|---|---|---|
| 3,673,146 | 6/1972 | Factor | 260/29.15 B |
| 4,066,611 | 1/1978 | Axelrod | 260/927 R |

*Primary Examiner*—Joseph L. Schofer
*Assistant Examiner*—Peter F. Kulkosky
*Attorney, Agent, or Firm*—Salvatore C. Mitri; William F. Mufatti

[57] ABSTRACT

A stabilized and plasticized polycarbonate composition comprising in admixture, an aromatic carbonate polymer and a stabilizing amount of an essentially monomeric organic silane. The composition can additionally contain a phosphite and/or an epoxy compound.

4 Claims, No Drawings

ORGANIC SILANE STABILIZED AND PLASTICIZED POLYCARBONATE COMPOSITION

This invention is directed to a stabilized and plasticized polycarbonate composition comprising in admixture, an aromatic carbonate polymer and a stabilizing amount of an essentially monomeric organic silane. The composition can additionally contain a phosphite and/or an epoxy compound.

BACKGROUND OF THE INVENTION

In the past, much effort has been expended in preparing thermally stable polycarbonate compositions which would be color stable at elevated temperatures and particularly at the high molding temperatures generally employed to prepare molded polycarbonate articles. Many different additives have been found that are quite suitable for rendering polycarbonates heat and color stable. Particularly useful are triorgano-phosphites which have been disclosed in U.S. Pat. No. 3,305,520. Also, U.S. Pat. No. 3,729,440 discloses a thermally stable aromatic polycarbonate containing a phosphinite and an epoxy compound. Further, U.S. Pat. No. 3,673,146 discloses a method for stabilizing polycarbonate resin involving using a triorganophosphite, cycloaliphatic epoxy compound, ultramarine pigment and aryl siloxane fluid.

Polycarbonate polymers are excellent molding materials as products made therefrom have high impact strength, toughness, high transparency, wide temperature limits (high impact resistance below −60° C. and a UL thermal endurance rating of 115° C. with impact), good dimensional stability, high creep resistance and electrical properties which qualify it as sole support for current carrying parts.

Polycarbonates are, however, very difficult to fabricate from melts for the reason that melts thereof have exceptionally high viscosities. Attempts to overcome this difficulty by the incorporation with the polycarbonate of materials known to reduce the viscosity of other resins have very generally been unsuccessful. Many standard viscosity control agents appear to have little or no effect on the vicosity of polycarbonate. Other compounds known to lower the viscosity of resins cause degradation of polycarbonate resins. Some compounds, conventionally employed to improve the workability of polymers, produce an embrittling effect on polycarbonates when they are mixed therewith and the resin is subjected to elevated temperatures as in molding. Still other materials, while satisfactory stiffness modifying agents for other plastics, are too volatile to be incorporated with polycarbonates since polycarbonates have much higher melting points than many other thermoplastics.

Combinations of aromatic carbonate polymers and polysiloxanes have been disclosed in the prior art. Goldberg (U.S. Pat. No. 2,999,845), for example, discloses polycarbonate polysiloxane copolymers wherein the polysiloxanes employed in the copolymer are useful in obtaining a moiety that is not merely mixed with the polycarbonate, but is part of the polycarbonate molecule as a copolymer.

Caird (U.S. Pat. No. 3,087,908) discloses a polycarbonate polysiloxane composition to facilitate formation of clear films. Further, Bostick (U.S. Pat. No. 3,751,519) describes a composition containing a polycarbonate and a cyclosiloxane to improve mold release properties.

In general, these prior art silicon-containing compositions include a polysiloxane moiety, i.e., the —Si—O—Si— linkage.

SUMMARY OF THE INVENTION

It has now been surprisingly discovered that, by admixing a minor amount of an essentially monomeric organic silane with an aromatic carbonate polymer, the resultant polycarbonate composition has improved thermal-oxidative stability as well as reduced melt viscosity and does not become brittle or degraded upon molding, thus retaining its characteristic high impact strength. The subject of the invention is thus a plasticized and stabilized polycarbonate composition comprising in admixture, an aromatic carbonate polymer and a plasticizing and stabilizing amount of an essentially monomeric organic silane selected from the following:

a. a silane characterized by the general formula:

$$R_a Si(OR')_b$$

wherein R is independently selected from the group consisting of aryl, alkyl, alkoxy and aryloxy of 1–6 carbon atoms; wherein R' is independently selected from the group consisting of aryl and alkyl of 1–6 carbon atoms; wherein $a+b=4$ and b is an integer equal to or greater than 1; wherein, when a is 2, the two R moieties can be connected; wherein two adjacent R' moieties can be connected; and wherein both R and R' can be independently substituted with one or more inert inorganic atoms or radicals;

b. a silane characterized by the general formula:

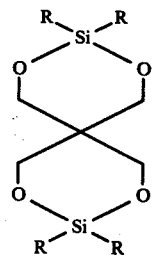

wherein R is as defined above, and wherein two R moieties joined to the same silicon atom can be connected, and mixtures thereof.

The term "alkyl" as used herein is meant to include primary, secondary and tertiary alkyl radicals.

Representative, but not limiting, examples of inert inorganic atoms or radicals which can be substituted on R and R' include halogens and nitro groups.

Preferred silanes are diphenyl dialkoxy silanes and dialkyl dialkoxy silanes. Most preferred silanes are of the general formulae:

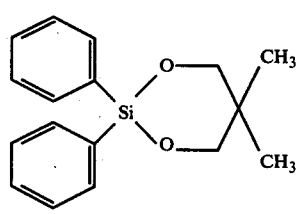

-continued

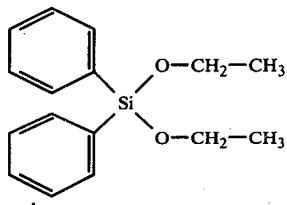

and

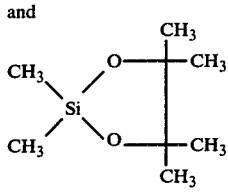

The organic silanes employed herein are prepared by methods known in the art. For example, a dialkyldichlorosilane reacted with alcohol or polyol will produce a dialkyldialkoxysilane. Likewise, a low order dialkyldialkoxysilane reacted with a higher boiling alcohol or polyol in the presence of a catalyst such as sodium methoxide will yield a higher order dialkyldialkoxysilane. Preparation methods are described further by C. Ecborn in *Organosilicon Compounds*, Butterworth Scientific Publications, London, England (1960).

The amount of organic silane employed in the practice of this invention can vary from 0.01 to about 10.0 parts per 100 parts of aromatic polycarbonate. Preferably, these organic silanes are employed in amounts from 0.1 to 5.0 parts per 100 parts of aromatic polycarbonate. A single silane compound can be employed, or mixtures of silane compounds can be employed.

In the practice of this invention, the aromatic polycarbonates that can be employed are homopolymers and copolymers and mixtures thereof which have an intrinsic viscosity of 0.40 to 1.0 dl./g. as measured in methylene chloride at 25° C. that are prepared by reacting a dihydric phenol with a carbonate precursor. Typical of some of the dihydric phenols that may be employed in the practice of this invention are bisphenol-A, (2,2-bis(4-hydroxyphenyl) propane, bis(4-hydroxyphenyl) methane, 2,2-bis(4-hydroxy-3-methylphenyl) propane, 4,4-bis(4-hydroxyphenyl) heptane, 2,2-(3,5,3',5'-tetrachloro-4,4'-dihydroxydiphenyl) propane, 2,2-(3,5,3',5'-tetrabromo-4,4'-dihydroxyphenyl) propane, (3,3'-dichloro-4,4'-dihydroxydiphenyl) methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate or an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acids or their haloformyl derivatives.

Also included herein are blends of a linear polycarbonate and a branched polycarbonate.

The co-stabilizing organophosphites which can be employed herein are of the formula

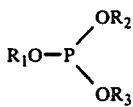

wherein $R_1$, $R_2$ and $R_3$ are independently selected from the group consisting of hydrogen, alkyl, aryl, cycloalkyl, aralkyl and alkylaryl radicals wherein at least one R is other than hydrogen. Preferably, the radicals have 1 to 20 carbon atoms. The alkyl may be methyl, ethyl, propyl, isopropyl, the various butyl isomers, e.g., butyl, sec-butyl, tert-butyl, the various amyl isomers, the various hexyl isomers, the various nonyl isomers, the various eicosyl isomers, etc.; the cycloalkyl may be cyclobutyl, cyclohexyl, 2-methylcyclohexyl, 4-methylcyclohexyl, 2-ethylcyclohexyl, 4-ethylcyclohexyl, 4-isopropylcyclohexyl, etc.; the aryl may be phenyl, 1-naphthyl, 2-naphthyl, biphenylyl, terphenylyl, etc.; the aralkyl may be any of the above alkyl substituted with one or more of the above aryl groups, e.g., benzyl, phenylethyl, 1-phenylpropyl, etc.; and the alkaryl may be any of the above aryls substituted with one or more of the above alkyls, e.g., o-tolyl, xylyl, cumyl, mesityl, butylphenyl, nonylphenyl, etc. Typical of some of the phosphites that can be employed in the practice of this invention are diphenyldodecylphosphite, triphenyl phosphite. bis-(t-butylphenyl) octylphosphite, tris(-nonylphenyl) phosphite, dipropylphenylphosphite, etc. The preferred phosphites to be employed herein are trialkyl phosphites, e.g., tris(p-nonylphenyl) phosphite, tridecyl phosphite, etc., diaryl alkyl phosphites, e.g., diphenyldecylphosphite, etc. The phosphite is present in an amount of from 0.005 to about 1.0 weight percent and more particularly 0.01 to about 0.2 weight percent based on the weight of the polycarbonate composition.

The co-stabilizing epoxy compounds which can be employed are selected from the following:

I. Derivatives of epoxy ethane represented by the following formula:

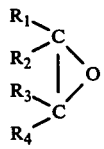

wherein $R_1$, $R_2$, $R_3$ and $R_4$ are independently selected from the group consisting of hydrogen, an alkyl radical of 1-24 carbon atoms, an aryl radical of 6-24 carbon atoms, —$CH_2OR'$, —$CH_2OCOR'$, —$CH_2OCOR'X$, —$'COOCH_2X$, —$CH_2OR'$ '$OCH_2X$ wherein $R'$ is selected from the group consisting of an alkyl radical of 1-24 carbon atoms or an aryl radical of 6 to 24 carbon atoms and wherein $R''$ is an alkylene radical of 1-24 carbon atoms and X is an oxirane ring.

II. Derivatives of epoxy cyclohexane represented by the following formula:

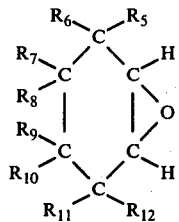

wherein $R_5$ through $R_{12}$ are independently selected from the group consisting of hydrogen, alkyl radicals of 1-24 carbon atoms, —$COOR_{13}$, —$OCOR_{13}$, —$COOR_{14}X$, —$OCOR_{14}$—$COOX$ wherein $R_{13}$ is an alkyl radical of 1-24 carbon atoms and $R_{14}$ therein is an alkylene radical of 1-24 carbon atoms and X is an oxirane ring.

While the actual number of hydrogen atoms employed may vary, it should be a function of the volatility of the epoxy compound. The number of hydrogen atoms should be such as to minimize the volatility of the epoxy compound since if the epoxy compound were to volatize at a low temperature, its benefit in use with a polycarbonate would be lost at the molding temperatures employed in preparing molded articles from the composition of this invention.

The amount of epoxy employed in the practice of this invention can vary from 0.01 to 0.5 weight percent based on the weight of the polymer composition and is preferably 0.03 to 0.30 weight percent. While more than 0.5 weight percent of epoxy can be employed, it has been found that higher amounts tend to degrade the physical properties of the polycarbonate and thereby reduce the usefulness of the polymer in providing tough, flexible molded articles.

In the practice of this invention, other epoxy compounds that have been employed in place of the 3,4-epoxy-cyclohexylmethyl-3,4-epoxycyclohexanecarboxylate with essentially the same results as those set forth previously as encompassed by the formula I and II are 3,4-epoxy-6-methylcyclohexylmethyl, 3,4-epoxy-6-methylcyclohexane carboxylate, 2,3-epoxycyclohexylmethyl, 3,4-epoxycyclohexane carboxylate, 4-(3,4-epoxy-4-methylcyclohexyl) butyl-3,4-epoxycyclohexane carboxylate, 3,4-epoxycyclohexyl ethyleneoxide, cyclohexyl 3,4-epoxy-cyclohexane carboxylate, 3,4-epxoy-6-methylcyclohexylmethyl-6-methylcyclohexyl carboxylate, bisphenol-A diglycidyl ether, tetrabromobisphenol-A diglycidyl ether, di-glycidyl ester of phthalic acid, diglycidyl ester of hexahydrophthalic acid, epoxidized soybean oil, epoxidized linseed oil, bisepoxycyclohexyl adipate, butadiene diepoxide, tetraphenylethylene-epoxide, octyl epoxy tallate and epoxidized polybutadiene. Also, 3,4-dimethyl-1,2-epoxycyclohexane, 3,5-dimethyl-1,2-epoxy cyclohexane, 3-methyl-5-tert butyl-1,2-epoxy cyclohexane, octadecyl 2,2-dimethyl-3,4-epoxycyclohexane carboxylate, N-butyl 2,2-dimethyl-3,4-epoxycyclohexane carboxylate, cyclohexyl 2-methyl-3,4-epoxycyclohexane carboxylate, N-butyl 2-isopropyl-3,4-epoxy-5-methylcyclohexane carboxylate, octadecyl-3,4-epoxycyclohexane carboxylate, 2-ethylhexyl 3',4'-epoxycyclohexane carboxylate, 4,6-dimethyl 2,3-epoxycyclohexyl 3',4'-epoxycyclohexane carboxylate, diethyl 4,5-epoxy-cis-1,2-cyclohexane dicarboxylate, di-n-butyl 3-tert-butyl-4,5-epoxy-cis-1,2-cyclohexane dicarboxylate. Specifically, any of the epoxycyclohexyl compounds meet the general formula of II and the other epoxy compounds recited herein meet the general formula of I. Preferably, the epoxy compound employed in the practice of this invention is 3,4-epoxycyclohexylmethyl 3,4-epoxycyclohexane carboxylate.

The composition of the instant invention may be prepared by blending the aromatic polycarbonate with the additive by conventional methods.

Obviously, other materials can also be employed with the aromatic carbonate polymer of this invention and include such materials as anti-static agents, mold release agents, pigments, thermal stabilizers, ultraviolet stabilizers, reinforcing fillers, such as glass and other inert fillers, foaming agents, and the like.

PREFERRED EMBODIMENT OF THE INVENTION

In order to more fully and clearly illustrate the present invention, the following specific Examples are presented. It is intended that the Examples be considered as illustrative rather than limiting the invention disclosed and claimed herein. In the Examples, all parts and percentages are on a weight basis unless otherwise specified. In each of the Examples, the polycarbonate compositions have mixed therewith 0.1 weight percent of a mixture of 1 part diphenyloctylphosphite and 2 parts 3,4-epoxycyclohexylmethyl-3,4-epoxycyclohexane carboxylate.

EXAMPLE I

A polycarbonate composition of a homopolymer of 2,2-bis(4-hydroxyphenyl) propane (hereinafter referred to as bisphenol-A) is prepared by reacting essentially equimolar amounts of bisphenol-A and phosgene in an aqueous organic medium with triethylamine, sodium hydroxide, and phenol under standard conditions. This composition is then fed to an extruder which extruder is operated at about 550° F., and the extrudate strands are chopped into pellets. Some of the pellets are injection molded into test samples of about 3 inches by 2 inches by ⅛ inch thick at 600° F. and 700° F. Thermal stability to discoloration is measured in accordance with ASTM Yellowness Index Test D1925 on samples molded at 600° F. and 700° F. These results are set forth in Table I.

Other pellets are fed into a plastometer and the flow rate of the polymer is measured according to ASTM D1238-70, Condition 0. The melt flow rate is set forth in Table I.

The composition is designated Sample A (CONTROL) in Table I.

EXAMPLE II

Example I is repeated except that 0.2 weight percent of a silane additive identified in Table I is added to the composition of Example I. Thermal stability to discoloration and melt flow rate are set forth in Table I. The composition is designated Sample B.

EXAMPLE III

Example II is repeated except that 0.4 weight percent of the silane additive is added to the composition of Example I. Results are set forth in Table I. This composition is designated Sample C.

EXAMPLE IV

A second polycarbonate composition of a homopolymer of 2,2-bis(4-hydroxyphenyl) propane (hereinafter referred to as bisphenol-A) is prepared by reacting essentially equimolar amounts of bisphenol-A and phosgene in an aqueous organic medium with triethylamine, sodium hydroxide, and phenol under standard conditions. This composition is then fed to an extruder which extruder is opearted at about 550° F., and the extrudate strands are chopped into pellets. Some of the pellets are injection molded into test samples of about 3 inches by 2 inches by ⅛ inch thick at 600° F. and 700° F. Thermal stability to discoloration is measured in accordance with ASTM Yellowness Index Test D1925 on samples molded at 600° F. and 700° F. These results are set forth in Table I. Additionally, the impact strength of these samples is measured according to the Izod test, ASTM D-256. The impact strength is set forth in Table I.

Other pellets are fed into a plastometer and the flow rate of the polymer is measured according to ASTM D1238-70, Condition 0. The melt flow rate is set forth in Table I.

The composition is designated Sample D (CONTROL) in Table I.

EXAMPLE V

Example IV is repeated except that 0.4 weight percent of a silane additive identified in Table I is added to the composition of Example IV. Thermal stability to discoloration, melt flow rate and impact strength are shown in Table I. The composition is designated Sample E.

EXAMPLE VI

A third polycarbonate composition of a homopolymer of 2,2-bis(4-hydroxyphenyl) propane (hereinafter referred to as bisphenol-A) is prepared by reacting essentially equimolar amounts of bisphenol-A and phosgene in an aqueous organic medium with triethylamine, sodium hydroxide, and phenol under standard conditions. This composition is then fed to an extruder which extruder is operated at about 550° F., and the extrudate strands are chopped into pellets. Some of the pellets are injection molded into test samples of about 3 inches by 2 inches by ⅛ inch thick at 600° F. and 700° F. Thermal stability to discoloration is measured in accordance with ASTM Yellowness Index Test D1925 on samples molded at 600° F. and 700° F. These results are set forth in Table I. Additionally, the impact strength of these samples is measured according to the Izod test, ASTM D-256. The impact strength is set forth in Table I.

Other pellets are fed into a plastometer and the flow rate of the polymer is measured according to ASTM D1238-70, Condition 0. The melt flow rate is set forth in Table I. The composition is designated Sample F (CONTROL) in Table I.

EXAMPLE VII

Example VI is repeated except that 0.4 weight percent of the silane additive employed in Example V is added to the composition of Example VI. Thermal stability to discoloration, melt flow rate, and impact strength are shown in Table I. The composition is designated Sample G.

EXAMPLE VIII

A fourth polycarbonate composition of a homopolymer of 2,2-bis(4-hydroxyphenyl) propane (hereinafter referred to as bisphenol-A) is prepared by reacting essentially equimolar amounts of bisphenol-A and phosgene in an aqueous organic medium with triethylamine, sodium hydroxide, and phenol under standard conditions. This composition is then fed to an extruder which extruder is operated at about 550° F., and the extrudate strands are chopped into pellets. Some of the pellets are injection molded into test samples of about 3 inches by 2 inches by ⅛ inch thick at 600° F. Thermal stability to discoloration is measured in accordance with ASTM Yellowness Index Test D1925 on a sample molded at 600° F. This result is set forth in Table I. Additionally, the impact strength of the sample is measured according to the Izod test, ASTM D-256. The impact strength is set forth in Table I.

Other pellets are fed into a plastometer and the flow rate of the polymer is measured according to ASTM D1238-70, Condition 0. The melt flow rate is set forth in Table I.

The composition is designated Sample H (CONTROL) in Table I.

EXAMPLE IX

Example VIII is repeated except that 0.4 weight percent of a silane additive identified in Table I is added to the composition of Example VIII. Thermal stability to discoloration, melt flow rate, and impact strength are shown in Table I. The composition is designated Sample J in Table I.

EXAMPLE X

A fifth polycarbonate composition of a homopolymer of 2,2-bis(4-hydroxyphenyl) propane (hereinafter referred to as bisphenol-A) is prepared by reacting essentially equimolar amounts of bisphenol-A and phosgene in an aqueous organic medium with triethylamine, sodium hydroxide, and phenol under standard conditions. This composition is then fed to an extruder which extruder is operated at about 550° F., and the extrudate strands are chopped into pellets. The pellets are injection molded into test samples of about 3 inches by 2 inches by ⅛ inch thick at 600° F. and 700° F. Thermal stability to discoloration is measured in accordance with ASTM Yellowness Index Test D1925 on samples molded at 600° F. and 700° F. These results are set forth in Table I.

The composition is designated Sample K (CONTROL) in Table I.

EXAMPLE XI

Example X is repeated except that 0.3 weight percent of the silane additive employed in Example IX is added to the composition of Example X. Thermal stability to discoloration is shown in Table I.

The composition is designated Sample L in Table I.

TABLE I

| Example No. | | Additive | Amt. of Additive (Parts per Hundred) | Melt Flow Rate (g/10 min.) | Yellowness Index 600° F | Yellowness Index 700° F | Impact Strength (Ft.Lbs./In.) |
|---|---|---|---|---|---|---|---|
| I | Sample A (CONTROL) | — | — | 4.98 | 1.1 | 11.7 | NM |
| II | Sample B | 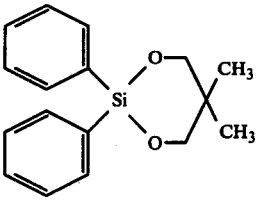 | 0.2 | 5.52 | 0.4 | 7.4 | NM |
| III | Sample C | Same as for Sample B | 0.4 | 6.78 | 0.2 | 6.3 | NM |
| IV | Sample D (CONTROL) | — | — | 4.68 | 1.7 | 12.8 | 17.89 |
| V | Sample E | 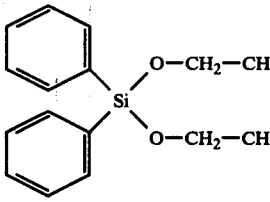 | 0.4 | 5.63 | 1.6 | 13.3 | 16.94 |
| VI | Sample F (CONTROL) | — | — | 15.60 | −0.5 | 7.0 | 15.18 |
| VII | Sample G | Same as for Sample E | 0.4 | 16.22 | −0.5 | 4.0 | 14.36 |
| VIII | Sample H (CONTROL) | — | — | 4.74 | 3.7 | NM | 16.4 |
| IX | Sample J | 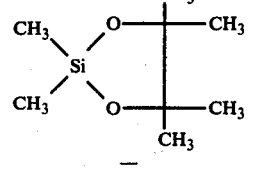 | 0.4 | 5.07 | 1.5 | NM | 16.8 |
| X | Sample K (CONTROL) | — | — | NM | 0.4 | 10.8 | NM |
| XI | Sample L | Same as for Sample J | 0.3 | NM | −0.3 | 7.7 | NM |

It can be seen from the data in Table I that when the instant silane additive is added to an aromatic polycarbonate, the resulting polycarbonate composition has reduced melt viscosity, as shown by the higher melt flow rate, while retaining impact strength. Additionally, said polycarbonate composition has increased thermal stability; i.e., a lower yellowness index. Significantly, these improved flow and color properties are obtained in the polycarbonate composition using relatively small amounts of the silane additive and without sacrificing impact properties.

It will thus be seen that the objects set forth above among those made apparent from the preceding description are efficiently attained and since certain changes may be made in carrying out the above process and in the composition set forth without departing from

What is claimed is:

1. A plasticized and stabilized polycarbonate composition comprising in admixture an aromatic carbonate polymer and a plasticizing and stabilizing amount of an essentially monomeric organic silane characterized by the following general formulae:

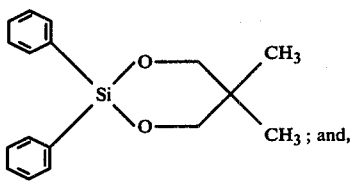 a)

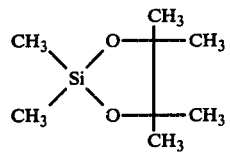 b)

2. The composition of claim 1 which contains a stabilizing amount of an organophosphite of the formula:

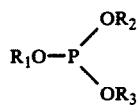

wherein $R_1$, $R_2$ and $R_3$ are independently selected from the group consisting of hydrogen, alkyl, aryl, cycloalkyl, aralkyl and alkylaryl radicals wherein at least one R is other than hydrogen.

3. The composition of claim 1 which contains a stabilizing amount of an epoxy compound selected from the following:

I. Derivatives of epoxy ethane represented by the following formula:

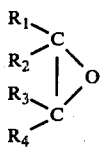

wherein $R_1$, $R_2$, $R_3$ and $R_4$ are independently selected from the group consisting of hydrogen, an alkyl radical of 1-24 carbon atoms, an aryl radical of 6-24 carbon atoms, —$CH_2OR'$, —$CH_2OCOR'$, —$CH_2OCOR'X$, —'$COOCH_2X$, —$CH_2OR'\lambda$ '$OCH_2X$ wherein R' is selected from the group consisting of an alkyl radical of 1-24 carbon atoms or an aryl radical of 6 to 24 carbon atoms and wherein R" is an alkylene radical of 1-24 carbon atoms and X is an oxirane ring;

II. Derivatives of epoxy cyclohexane represented by the following formula:

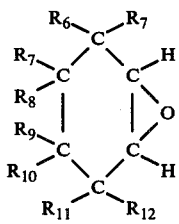

wherein $R_5$ through $R_{12}$ are independently selected from the group consisting of hydrogen, alkyl radicals of 1-24 carbon atoms, —$COOR_{13}$, —$OCOR_{13}$, —$COOR_{14}X$, —$OCOR_{14}$—$COOX$ wherein $R_{13}$ is an alkyl radical of 1-24 carbon atoms and $R_{14}$ therein is an alkylene radical of 1-24 carbon atoms and X is an oxirane ring.

4. The composition of claim 3 which contains a stabilizing amount of a organophosphite of the formula:

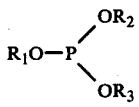

wherein $R_1$, $R_2$ and $R_3$ are independently selected from the group consisting of hydrogen, alkyl, aryl, cycloalkyl, aralkyl and alkylaryl radicals wherein at least one R is other than hydrogen.

* * * * *

UNITED STATES PATENT AND TRADEMARK OFFICE
CERTIFICATE OF CORRECTION

PATENT NO. : 4,138,379
DATED : February 6, 1979
INVENTOR(S) : Steven William Scott et al.

It is certified that error appears in the above-identified patent and that said Letters Patent are hereby corrected as shown below:

Claim 3, Column 12, line 13, "$-CH_2OR\lambda$" should read -- $CH_2OR''$ --.

Signed and Sealed this

Thirtieth Day of October 1979

[SEAL]

Attest:

RUTH C. MASON
*Attesting Officer*

LUTRELLE F. PARKER
*Acting Commissioner of Patents and Trademarks*